(12) United States Patent
Lee

(10) Patent No.: US 9,928,444 B2
(45) Date of Patent: Mar. 27, 2018

(54) IMAGE RECOGNIZING APPARATUS AND METHOD THAT INFORMS THE DRIVER THAT THE IMAGE IS NOT RECOGNIZED WHEN IT IS DETERMINED THAT A DISTURBANCE OCCURS IN THE IMAGE

(71) Applicant: Hyundai Mobis Co., Ltd., Seoul (KR)

(72) Inventor: Sung joo Lee, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 210 days.

(21) Appl. No.: 14/885,197

(22) Filed: Oct. 16, 2015

(65) Prior Publication Data

US 2016/0110606 A1 Apr. 21, 2016

(30) Foreign Application Priority Data

Oct. 17, 2014 (KR) ........................ 10-2014-0141124

(51) Int. Cl.
*G06K 9/00* (2006.01)
*G06K 9/62* (2006.01)

(52) U.S. Cl.
CPC ....... *G06K 9/6262* (2013.01); *G06K 9/00798* (2013.01)

(58) Field of Classification Search
None
See application file for complete search history.

(56) References Cited

U.S. PATENT DOCUMENTS

| 2008/0192984 | A1* | 8/2008 | Higuchi | G08G 1/16 |
| | | | | 382/104 |
| 2010/0172542 | A1* | 7/2010 | Stein | G06K 9/00798 |
| | | | | 382/103 |
| 2013/0235201 | A1 | 9/2013 | Kiyohara et al. | |

FOREIGN PATENT DOCUMENTS

CN 103303205 9/2013

OTHER PUBLICATIONS

Office Action dated Jan. 2, 2018, of the CN Patent Application No. 201510663308.9.

* cited by examiner

*Primary Examiner* — Atiba O Fitzpatrick
(74) *Attorney, Agent, or Firm* — H.C. Park & Associates, PLC

(57) ABSTRACT

An image recognizing apparatus, including: a camera which outputs at least one of a front image and a rear image of a vehicle; a disturbance estimating unit which outputs an image which is estimated as a disturbance according to a visibility of an image; a disturbance classifying unit which outputs a cause of disturbance according to a brightness of a pixel in the disturbance estimated image; a disturbance result determining unit which determines whether the disturbance is generated in the image in accordance with accumulated cause of the disturbance; and an image recognizing unit which informs the driver that the image is not recognized when it is determined that disturbance occurs in the image.

12 Claims, 3 Drawing Sheets

IMAGE RECOGNIZING APPARATUS AND METHOD THAT INFORMS THE DRIVER THAT THE IMAGE IS NOT RECOGNIZED WHEN IT IS DETERMINED THAT A DISTURBANCE OCCURS IN THE IMAGE

CROSS-REFERENCE TO RELATED APPLICATION

This application claims priority from and the benefit of Korean Patent Application No. 10-2014-0141124, filed on Oct. 17, 2014, which is hereby incorporated by reference for all purposes as if fully set forth herein.

BACKGROUND

Field

Exemplary embodiments relate to an image recognizing apparatus and an image recognizing method. Exemplary embodiments also relate to an image recognizing apparatus and an image recognizing method which inform a driver of a disturbance of an image of a vehicle.

Discussion of the Background

Recently, a technology which obtains a front image of a vehicle to recognize a lane on which the vehicle is driven and issues a warning to the driver when the vehicle is out of the lane, or detects a pedestrian or an object from the front image of the vehicle to issue a warning to the driver, is employed in the vehicle. A precise front image of the vehicle is useful in order to implement this technology.

Recently, a technology which detects an image disturbance, such as a foreign substance, from the front image of the vehicle at a high speed and informs the driver of the image disturbance, has been studied.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide an image recognizing apparatus and an image recognizing method, which inform a driver of a disturbance of an image of a vehicle.

Additional aspects will be set forth in the detailed description which follows, and, in part, will be apparent from the disclosure, or may be learned by practice of the inventive concept.

An exemplary embodiment of the present invention discloses an image recognizing apparatus, including: a camera configured to output at least one of a front image and a rear image of a vehicle; a disturbance estimating unit configured to output an image which is estimated to be a disturbance according to a visibility of an image output from the camera; a disturbance classifying unit configured to output a cause of disturbance according to brightness of pixels in the disturbance estimated image; a disturbance result determining unit configured to determine whether the disturbance is generated in the image in accordance with an accumulated cause of the disturbance; and an image recognizing unit configured to inform the driver that the image is not recognized when it is determined that disturbance occurs in the image.

An exemplary embodiment of the present invention also discloses an image recognizing method, including: outputting at least one of a front image and a rear image of a vehicle; outputting an image which is estimated as a disturbance according to a visibility of an image; outputting a cause of disturbance according to a brightness of a pixel in the disturbance estimated image; and outputting different results in accordance with the cause of disturbance to a buffer to accumulatively store the results.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
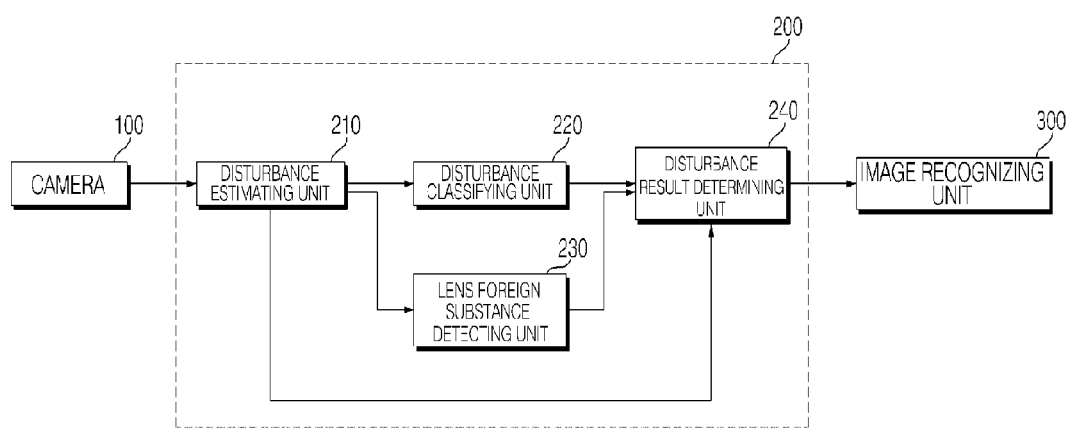
FIG. 1 is a diagram illustrating a configuration of an image recognizing apparatus according to an exemplary embodiment of the present invention.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element is referred to as being "on," "connected to," or "coupled to" another element, it may be directly on, connected to, or coupled to the other element or intervening elements may be present. When, however, an element is referred to as being "directly on," "directly connected to," or "directly coupled to" another element, there are no intervening elements present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, and/or sections, these elements, components, and/or sections should not be limited by these terms. These terms are used to distinguish one element, component, and/or section from another element, component, and/or section. Thus, a first element, component, and/or section discussed below could be termed a second element, component, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Referring to FIG. 1, an image recognizing apparatus according to an exemplary embodiment of the present invention includes a camera 100, a disturbance estimating unit 210, a disturbance classifying unit 220, a lens foreign substance detecting unit 230, a disturbance result determining unit 240, and an image recognizing unit 300.

The camera 100 generates at least one of a front image and a rear image of the vehicle to output the generated image to the disturbance estimating unit 210.

The disturbance estimating unit 210 outputs an image which is estimated as a disturbance according to a visibility of an output image. The disturbance estimating unit 210 measures a brightness variation between adjacent pixels of the image to output an image which is estimated to be a disturbance. The disturbance estimating unit 210 converts the image into a gray image. The disturbance estimating unit 210 measures a brightness variation (MoG) between adjacent pixels from the converted gray image to calculate a brightness variation map. When a value of the brightness variation (MoG) between pixels is greater than or equal to a predetermined threshold value, the disturbance estimating unit 210 classifies the image as a normal image. When the value of the brightness variation (MoG) between adjacent pixels is less than a predetermined threshold value, the disturbance estimating unit 210 classifies the image as a disturbance estimated image. In the meantime, the disturbance estimating unit 210 calculates the brightness variation (MoG) between pixels as represented in Equation 1.

$$MoG = \sum_{x=1}^{m}\sum_{y=1}^{n} |I(x, y) - I(x+1, y)| + |I(x, y) - I(x, y+2)|/mn \qquad \text{Equation 1}$$

In Equation 1, which is used by the disturbance estimating unit 210, I(x, y) refers to a brightness of a pixel in a coordinate (x, y). In Equation 1, which is used by the disturbance estimating unit 210, m indicates a horizontal length of a set region of interest and n indicates a vertical length of the set region of interest.

The disturbance estimating unit 210 sets a region of interest in the brightness variation map. The disturbance estimating unit 210 may set a region of interest in the gray image. The disturbance estimating unit 210 determines whether a minimum value of the brightness variation (MoG) between adjacent pixels exceeds the predetermined threshold value in the region of interest. When the minimum value of the brightness variation (MoG) between adjacent pixels is equal to or less than the predetermined threshold value in the region of interest, the disturbance estimating unit 210 outputs a disturbance estimated image to the disturbance classifying unit 220.

The disturbance classifying unit 220 receives the disturbance estimated image output from the disturbance estimating unit 210. The disturbance classifying unit 220 outputs a cause of the disturbance according to the brightness of the pixels in the disturbance estimated image. When the number of pixels having at least a predetermined brightness level set in the region of the disturbance estimated image is greater than or equal to a predetermined threshold value, the disturbance classifying unit 220 determines that the disturbance estimated image is saturated. Here, the saturation of the image means a phenomenon in which an entire brightness of the image is so bright that an object cannot be distinguished. When the number of pixels having at least the predetermined brightness level set in the disturbance estimated image is less than a predetermined threshold value, the disturbance classifying unit 220 determines that the disturbance estimated image has low luminance.

The disturbance classifying unit 220 determines whether an image saturation phenomenon occurs in the disturbance estimated image. The image saturation phenomenon may be generated by head lights of a vehicle incoming from the front of the vehicle. The image saturation phenomenon may be generated when the vehicle exits out of a tunnel. The disturbance classifying unit 220 measures the number of pixels having at least a predetermined brightness level which is greater than or equal to the predetermined threshold value in the region of interest set in the disturbance estimated image, in order to determine whether the image is saturated. When the number of pixels having at least the predetermined brightness level is equal to or greater than the predetermined threshold value, the disturbance classifying unit 220 determines that the disturbance estimated image is saturated. That is, disturbance is generated in the image.

The disturbance classifying unit 220 determines whether luminance of the disturbance estimated image is low. When the vehicle enters a tunnel or no night illumination is provided, the disturbance classifying unit 220 may determine that the luminance of the image is low. The disturbance classifying unit 220 measures a number of pixels which is equal to or less than the predetermined brightness value from the disturbance estimated image to determine whether the luminance is low. The disturbance classifying unit 220 outputs a signal for one result for every frame to a first result buffer TB1 of the disturbance result determining unit 240 to store the signal, as shown in FIG. 2.

The disturbance classifying unit 220 determines whether a fog is detected from the image. When the fog is detected, the disturbance classifying unit 220 outputs a signal for a fog detecting result to the disturbance result determining unit 240 to store the signal. The disturbance classifying unit 220 outputs a signal for one result for every frame N, N+1, ... N+5, to a first result buffer TB1 of the disturbance result determining unit 240 to store the signal. When the fog is detected from the disturbance estimated image, the disturbance classifying unit 220 outputs a fog signal Fg to the first result buffer TB1 of the disturbance result determining unit 240 to store the fog signal. When the fog is not detected from the disturbance estimated image, the disturbance classifying unit 220 outputs a normal signal N to the first result buffer TB1 of the disturbance result determining unit 240 to store the normal signal, as shown in FIG. 2. The disturbance classifying unit 220 estimates a location of a light source in the disturbance estimated image. The disturbance classifying unit 220 detects a light region of a street lamp for every street. The disturbance classifying unit 220 detects a disturbed light size from the region where the light region is detected to detect fog from the disturbance estimated image.

The lens foreign substance detecting unit 230 analyzes the disturbance estimated image to determine whether there is a foreign substance on a lens of the camera 100. The lens foreign substance detecting unit 230 determines whether there is a foreign substance on the lens of the camera 100 to output a result of determining presence of the foreign substance on the lens to the disturbance result determining unit 240. When the lens foreign substance detecting unit 230 determines that there is a foreign substance on the lens of the camera 100, the lens foreign substance detecting unit 230 outputs a foreign substance signal C to a second result buffer TB1 of the disturbance result determining unit 240 to store the foreign substance signal, as shown in FIG. 2. The lens foreign substance detecting unit 230 detects whether white light is emitted from the disturbance estimated image. When the lens foreign substance detecting unit 230 detects that the white light is emitted, the white light is converted into a plurality of brightness/color data in a sensing signal. The lens foreign substance detecting unit 230 compares the plurality of brightness/color data to detect the foreign substance of the lens of the camera 100. The lens foreign substance detecting unit 230 may output one determining result signal for every five frames.

Figure 2:
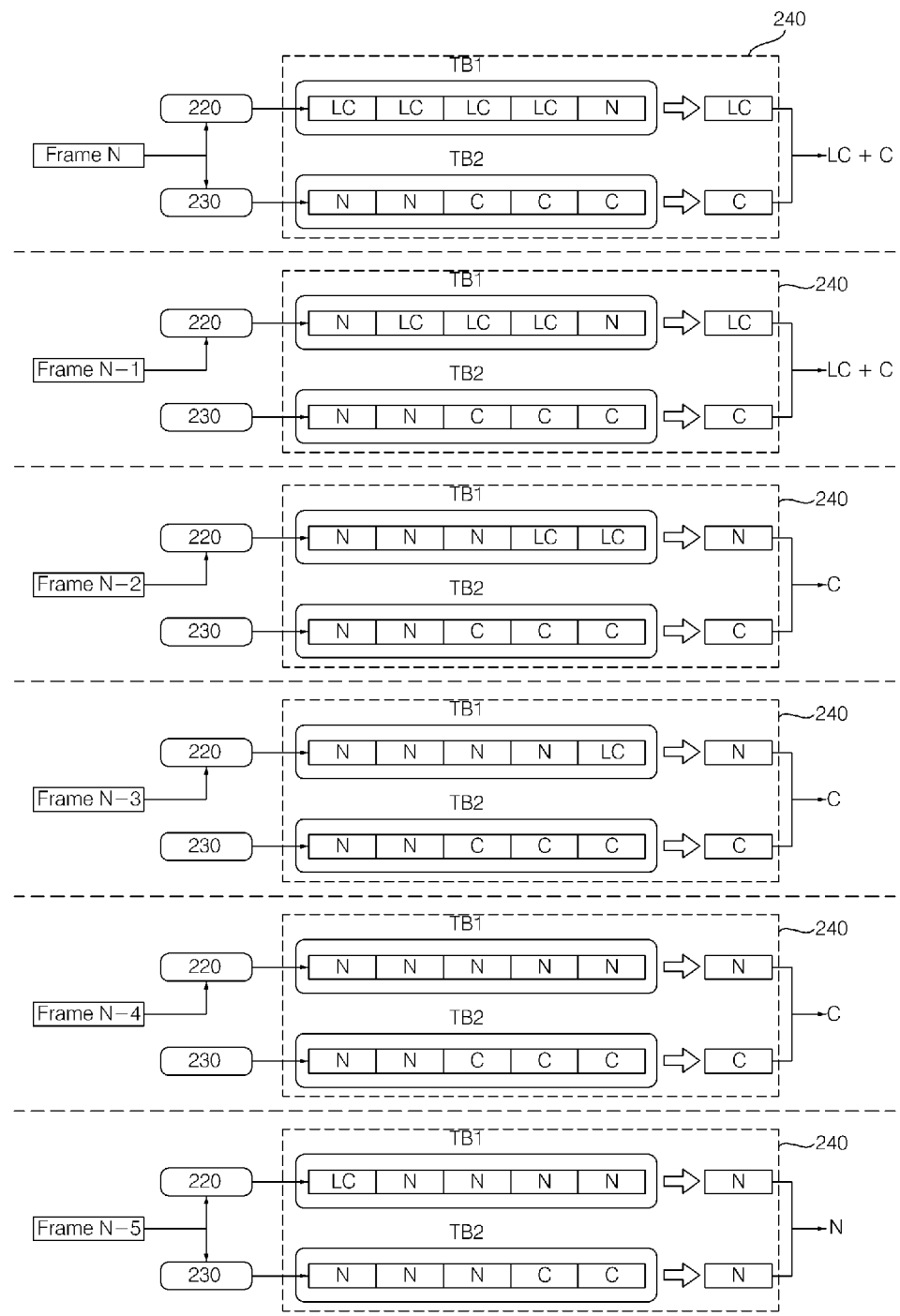
FIG. 2 is an exemplary view illustrating a result buffer structure of a disturbance result determining unit illustrated in FIG. 1 and a disturbance result determining process according to an exemplary embodiment.
Figure 3:
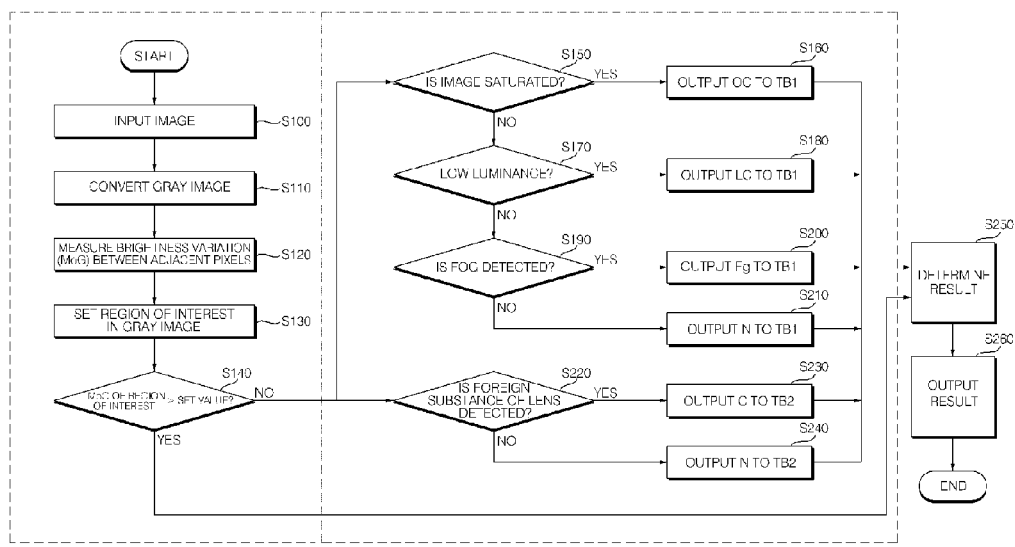
FIG. 3 is a control flow chart illustrating a control flow of a configuration of an image recognizing apparatus according to an exemplary embodiment of FIG. 1.

When the disturbance estimating unit 210 determines that the minimum value of the brightness variation MoG between adjacent pixels in the region of interest exceeds the predetermined threshold value, the disturbance estimating unit 210 outputs the normal signal N to the first result buffer TB1 of the disturbance result determining unit 240 to store the normal signal N, as shown in FIG. 2. The disturbance result determining unit 240 outputs the normal signal N, the low luminance signal LC, and the fog signal Fg to the first result buffer TB1 to store the signals, as shown in FIG. 3. The normal signal N, which is stored in the first result buffer TB1 of the disturbance result determining unit 240, is stored when an image, which is determined by the disturbance estimating unit 210 or the disturbance classifying unit 220, is a normal image, which does not have disturbance or foreign substance. The low luminance signal LC, which is stored in the first result buffer TB1 of the disturbance result determining unit 240, is stored when the disturbance estimated image, which is determined by the disturbance classifying unit 220, is saturated. The fog signal Fg, which is stored in the first result buffer TB1 of the disturbance result determining unit 240, is stored when the disturbance estimated image, which is determined by the disturbance classifying unit 220, has a fog.

The disturbance result determining unit 240 determines the disturbance result of the disturbance estimated image in accordance with accumulated cause of the disturbance. When the disturbance of the disturbance estimated image is determined, the disturbance result determining unit 240 stores a signal indicating whether disturbance occurs in the result buffer to determine the disturbance result of the disturbance estimated image. The disturbance result determining unit 240 may simultaneously store results output from at least one of the disturbance classifying unit 220 and the lens foreign substance detecting unit 230 in parallel. The disturbance result determining unit 240 includes the result buffer according to an exemplary embodiment.

The disturbance result determining unit 240 stores a signal for five results, which are output by the disturbance classifying unit 220 and the lens foreign substance detecting unit 230, in the result buffer of the disturbance result determining unit 240 according to an exemplary embodiment. The number of signals for a result, which is stored by the result buffer of the disturbance result determining unit 240, may vary by setting. The disturbance result determining unit 240 stores an image saturation determining result, a low luminance determining result, and a fog detecting result, which are output by the disturbance classifying unit 220 for every frame according to an exemplary embodiment. The disturbance result determining unit 240 stores a lens foreign substance presence determining result, which is output by the lens foreign substance detecting unit 230 for every five frames according to the exemplary embodiment. The process of storing, by the disturbance result determining unit 240, the results output by the disturbance classifying unit 220 and the lens foreign substance detecting unit 230 in the result buffer to calculate the disturbance result will be described with reference to FIG. 2.

The image recognizing unit 300 informs a driver that the image cannot be recognized when disturbance is generated in the image. The image recognizing unit 300 may inform the driver that the image cannot be recognized, through sound and/or a screen.

FIG. 2 illustrates a result buffer structure of the disturbance result determining unit 240 illustrated in FIG. 1 and a disturbance result determining process according to an exemplary embodiment.

Referring to FIG. 2, the result buffer of the disturbance result determining unit 240 stores a signal for results, which are output by the disturbance classifying unit 220 and the lens foreign substance detecting unit 230. That is, the disturbance classifying unit 220 outputs a signal for one result for every frame to a first result buffer TB1 of the disturbance result determining unit 240. The number of signals for a result, which is stored by the result buffer of the disturbance result determining unit 240, may vary by setting. The disturbance result determining unit 240 stores an image saturation determining result, a low luminance determining result, and a fog detecting result, which are output by the disturbance classifying unit 220 for every frame according to an exemplary embodiment. The disturbance result determining unit 240 stores a lens foreign substance presence determining result, which is output by the lens foreign substance detecting unit 230 for every five frames according to the exemplary embodiment. The result buffer of the disturbance result determining unit 240 may store five determining results for every frame.

The disturbance result determining unit 240 stores the disturbance detecting result output by the disturbance classifying unit 220 in the first result buffer TB1. When an N-th frame Frame N is received, the disturbance result determining unit 240 stores a signal for a result output by the disturbance classifying unit 220 in the first result buffer TB1. The disturbance result determining unit 240 stores a signal for the lens foreign substance presence determining result output by the lens foreign substance detecting unit 230 in the second result buffer TB2. According to an exemplary embodiment, the disturbance result determining unit 240 counts the number of results which are stored in the first result buffer TB1 and the second result buffer TB2. According to an exemplary embodiment, the disturbance result determining unit 240 outputs a signal for a result which is the most frequently detected in the first result buffer TB1 and the second result buffer TB2 as a disturbance result.

When the disturbance result determining unit 240 receives a N-th frame Frame N to (N+4)-th frame Frame N+4, the disturbance result determining unit 240 stores a result output by the disturbance classifying unit 220 in the first result buffer TB1 to determine the disturbance result.

According to an exemplary embodiment, when the disturbance classifying unit 220 determines that the disturbance estimated image has low luminance in the disturbance estimated image of the N-th frame Frame N to output a low luminance signal LC, the disturbance result determining unit 240 stores the low luminance signal LC in the first result buffer TB1. The disturbance result determining unit 240 stores four low luminance signals LC and one normal signal N in the first result buffer TB1. Because the low luminance signal LC is the most frequently stored in the disturbance result determining unit 240, a result is output indicating that the disturbance estimated image has a low luminance. When the lens foreign substance detecting unit 230 determines that the disturbance estimated image is normal in the disturbance estimated image of the N-th frame Frame N to output the normal signal N, the disturbance result determining unit 240 stores the normal signal N in the second result buffer TB2. The disturbance result determining unit 240 stores two normal signals N and three foreign substance signal C in the second result buffer TB2. Because the foreign substance signal C is the most stored in the disturbance result determining unit 240, a result indicating that the foreign substance is present on the lens is output.

According to the exemplary embodiment, the disturbance result determining unit 240 outputs a signal for a determining result of the disturbance classifying unit 220 in an (N+1)-th frame Frame N+1 to an (N+4)-th frame Frame N+4 to the first result buffer TB1 of the disturbance result determining unit 240. The lens foreign substance detecting unit 230 may not output the foreign substance presence result of the lens to the disturbance result determining unit 240 in the (N+1)-th frame Frame N+1 to the (N+4)-th frame Frame N+4.

When the disturbance classifying unit 220 determines that the disturbance estimated image is normal in the (N+1)-th frame Frame N+1 according to the exemplary embodiment to output the normal signal N, the disturbance result determining unit 240 stores the normal signal N in the first result buffer TB1. The disturbance result determining unit 240 stores three low luminance signals LC and two normal signals N in the first result buffer TB1. Since the low luminance signal LC is the most stored in the disturbance result determining unit 240, a result indicating that the disturbance estimated image has a low luminance is output.

When the disturbance classifying unit 220 determines that the disturbance estimated image is normal in the (N+2)-th frame Frame N+2 according to the exemplary embodiment to output the normal signal N, the disturbance result determining unit 240 stores the normal signal N in the first result buffer TB1. The disturbance result determining unit 240 stores two low luminance signals LC and three normal signals N in the first result buffer TB1. Because the normal signal N is the most stored in the disturbance result determining unit 240, a result indicating that the disturbance estimated image is normal is output.

When the disturbance classifying unit 220 determines that the disturbance estimated image is normal in the (N+3)-th frame Frame N+3 according to the exemplary embodiment to output the normal signal N, the disturbance result determining unit 240 stores the normal signal N in the first result buffer TB1. The disturbance result determining unit 240 stores four normal signals N and one low luminance signal LC in the first result buffer TB1. Because the normal signal N is the most frequently stored in the disturbance result determining unit 240, a result indicating that the disturbance estimated image is normal is output.

When the disturbance classifying unit 220 determines that the disturbance estimated image is normal in the (N+4)-th frame Frame N+4 according to the exemplary embodiment to output the normal signal N, the disturbance result determining unit 240 stores the normal signal N in the first result buffer TB1. The disturbance result determining unit 240 stores five normal signals N in the first result buffer TB1. Because the normal signal N is the most frequently stored in the disturbance result determining unit 240, a result indicating that the disturbance estimated image is normal is output.

The disturbance classifying unit 220 and the lens foreign substance detecting unit 230 outputs the result signal to the disturbance result determining unit 240 in the (N+5)-th frame Frame N+5. When the disturbance classifying unit 220 determines that the disturbance estimated image has a low luminance in the (N+5)-th frame Frame N+5 according to the exemplary embodiment to output the low luminance signal LC, the disturbance result determining unit 240 stores the low luminance signal LC in the first result buffer TB1. The disturbance result determining unit 240 stores one low luminance signal LC and four normal signals N in the first result buffer TB1. Because the normal signal N is the most stored in the disturbance result determining unit 240, a result indicating that the disturbance estimated image is normal is output.

When the lens foreign substance detecting unit 230 determines that the disturbance estimated image is normal in the (N+5)-th frame Frame N+5 according to the exemplary embodiment to output the normal signal N, the disturbance result determining unit 240 stores the normal signal N in the second result buffer TB2. The disturbance result determining unit 240 stores three normal signals N and two foreign substance signal C in the second result buffer TB2. Because the normal signal N is the most frequently stored in the disturbance result determining unit 240, a result indicating that the disturbance estimated image is normal is output.

An operation of an image recognizing method according to an exemplary embodiment of the present invention configured as described will be described below. FIG. 3 is a control flow chart illustrating a control flow of a configuration of an image recognizing apparatus according to an exemplary embodiment of FIG. 1.

Referring to FIG. 3, the camera 100 outputs at least one of a front image and a rear image of the vehicle in step S100.

The disturbance estimating unit 210 converts a received image into a gray image in step S110.

The disturbance estimating unit 210 measures a brightness variation (MoG) between adjacent pixels from the converted gray image to calculate a brightness variation map in step S120. The disturbance estimating unit 210 calculates a brightness variation map by Equation 1.

The disturbance estimating unit 210 sets a region of interest in the brightness variation map in step S130. The disturbance estimating unit 210 may set a region of interest in the gray image.

The disturbance estimating unit 210 determines whether a minimum value of the brightness variation (MoG) between adjacent pixels exceeds the predetermined threshold value in the region of interest in step S140. When the disturbance estimating unit 210 determines that the minimum value of the brightness variation MoG between adjacent pixels in the region of interest exceeds the predetermined threshold value, the disturbance estimating unit 210 outputs the normal signal N to the first result buffer TB1 of the disturbance result determining unit 240.

When the minimum value of the brightness variation (MoG) between adjacent pixels is equal to or less than the predetermined threshold value in the region of interest, the disturbance estimating unit 210 outputs a disturbance estimated image to the disturbance classifying unit 220 and the lens foreign substance detecting unit 230. The disturbance classifying unit 220 determines whether an image saturation phenomenon occurs in the disturbance estimated image in step S150. When the number of pixels having at least a predetermined brightness level set in the region of the disturbance estimated image exceeds a predetermined threshold value, the disturbance classifying unit 220 determines that the disturbance estimated image is saturated.

When an image in the disturbance estimated image is saturated, the disturbance classifying unit 220 outputs an image saturation signal OC to the first result buffer TB1 of the disturbance result determining unit 240 in step S160.

When the image saturation phenomenon is not generated in the disturbance estimated image, the disturbance classifying unit 220 determines whether a luminance of the image is low in step S170. When the number of the pixels having at least a predetermined brightness level set in the disturbance estimated image is less than a predetermined threshold value, the disturbance classifying unit 220 determines that the disturbance estimated image has low illumination.

When the luminance of the image is low, the disturbance classifying unit 220 outputs the low luminance signal LC to the first result buffer TB1 of the disturbance result determining unit 240 in step S180.

When the luminance of the image is not low, the disturbance classifying unit 220 determines whether fog is detected from the disturbance estimated image in step S190.

When the fog is detected from the disturbance estimated image, the disturbance classifying unit 220 outputs a fog signal Fg to the first result buffer TB1 of the disturbance result determining unit 240 in step S200.

When the fog is not detected from the disturbance estimated image, the disturbance classifying unit 220 outputs a normal signal N to the first result buffer TB1 of the disturbance result determining unit 240 in step S210.

The lens foreign substance detecting unit 230 analyzes the disturbance estimated image to determine whether there is a foreign substance on a lens of the camera 100 in step S220.

When the lens foreign substance detecting unit 230 determines that there is a foreign substance on the lens of the camera 100, the lens foreign substance detecting unit 230 outputs a foreign substance signal C to a second result buffer TB2 of the disturbance result determining unit 240 in step S230.

When the lens foreign substance detecting unit 230 determines that there is no foreign substance on the lens of the camera 100, the lens foreign substance detecting unit 230 outputs a normal signal N to a second result buffer TB2 of the disturbance result determining unit 240 in step S240.

When the disturbance estimating unit 210 determines that the minimum value of the brightness variation MoG between adjacent pixels in the region of interest exceeds the predetermined threshold value, the disturbance result determining unit 240 stores the normal signal N in the first result buffer TB1 in step S250. The disturbance result determining unit 240 stores the normal signal N, which is output by the disturbance classifying unit 220, in the first result buffer TB1. The disturbance result determining unit 240 stores the low luminance signal LC output by the disturbance classifying unit 220 in the first result buffer TB1. The disturbance result determining unit 240 stores the fog signal Fg output by the disturbance classifying unit 220 in the first result buffer TB1. The disturbance result determining unit 240 stores the normal signal N output by the disturbance classifying unit 220 in the first result buffer TB1. The disturbance result determining unit 240 stores the foreign substance signal C output by the lens foreign substance detecting unit 230 in the second result buffer TB2. The disturbance result determining unit 240 stores the normal signal N output by the lens foreign substance detecting unit 230 in the second result buffer TB2.

The disturbance result determining unit 240 may simultaneously store results output from at least one of the disturbance classifying unit 220 and the lens foreign substance detecting unit 230 in parallel.

The disturbance result determining unit 240 determines the most frequent results in the most frequently stored results to calculate the disturbance result with reference to FIG. 2.

The image recognizing unit 300 informs the driver that the image cannot be recognized when disturbance is generated in the image in accordance with the disturbance result output by the disturbance result determining unit 240 in step S260. The image recognizing unit 300 may inform the driver that the image cannot be recognized, through sound and/or a screen.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. An image recognizing apparatus, comprising:
   a camera configured to output at least one of a front image and a rear image of a vehicle;
   an disturbance estimator configured to output an image which is estimated as a disturbance according to a visibility of an image output from the camera;
   a disturbance classifier configured to output a cause of disturbance according to brightness of pixels in the disturbance estimated image;

a disturbance result determiner configured to determine whether the disturbance is generated in the image in accordance with accumulated cause of the disturbance; and an image recognizer configured to inform the driver that the image is not recognized when it is determined that disturbance occurs in the image, wherein:

the disturbance estimator is configured to convert an image output from the camera into a gray image;

the disturbance estimator measures a brightness variation between adjacent pixels of the image in the region of interest of the gray image using a brightness variation map to output an image which is estimated as disturbance;

the disturbance classifier is configured to calculate a disturbed light size from the disturbance estimated image to detect fog; the image recognizing apparatus further comprises a foreign substance detector configured to detect illumination of white light in the disturbance estimated image and to compare brightness/color data to detect a foreign substance on a lens of the camera; and the disturbance result determiner is configured to store the detection number of fog in a first buffer and the detection number of foreign substance in a second buffer, and determine whether either of the detection number of fog or the detection number of foreign substance exceeds a predetermined number to determine whether the disturbance occurs in the image.

2. The image recognizing apparatus of claim 1, wherein, when a number of pixels having at least a predetermined brightness level in the set region of the disturbance estimated image is greater than or equal to a predetermined threshold value, the disturbance classifier determines that the disturbance estimated image is saturated.

3. The image recognizing apparatus of claim 1, wherein, when the number of the pixels having at least a predetermined brightness level set in the disturbance estimated image is less than a predetermined ratio, the disturbance classifier determines that the disturbance estimated image has low luminance.

4. The image recognizing apparatus of claim 1, wherein, when the disturbance of the disturbance estimated image is determined, the disturbance classifier determines the disturbance result of the image by storing whether there is disturbance in a first buffer.

5. The image recognizing apparatus of claim 1, wherein the disturbance classifier is configured to output one result for every frame of the image to the first buffer.

6. The image recognizing apparatus of claim 1, wherein the foreign substance detector outputs one result for every five frames of the image to the second buffer.

7. An image recognizing method, comprising:
outputting at least one of a front image and a rear image of a vehicle;
outputting an image which is estimated as a disturbance in according to a visibility of an image;
outputting a cause of disturbance according to a brightness of a pixel in the disturbance estimated image; and
outputting different results according to the cause of disturbance to a first buffer and a second buffer to accumulatively store the results, wherein:

in the outputting of a disturbance estimated image, the image is converted into a gray image and a region of interest is set in the gray image;

in the outputting of a disturbance estimated image, a brightness variation between adjacent pixels in the region of interest of the gray image is measured using a brightness variation map to output an image which is estimated as disturbance;

in the accumulatively storing of a cause of disturbance, the result is stored in the first and second buffers depending on whether a foreign substance in a camera which photographs the image is detected, fog, and image disturbance; and when the number of times of detecting a foreign substance is greater than a number of normal results from the result which is stored in the buffer, it is determined that the foreign substance is present in the image so that the image has low luminance.

8. The image recognizing method of claim 7, wherein in the outputting of a cause of disturbance, when a number of pixels having at least a predetermined brightness level set in the set region of the disturbance estimated image is greater than or equal to a predetermined threshold value, it is determined that the disturbance estimated image is saturated.

9. The image recognizing method of claim 7, wherein in the outputting of a cause of disturbance, when the number of the pixels having at least a predetermined brightness level set in the disturbance estimated image is less than a predetermined value, it is determined that the disturbance estimated image has low luminance.

10. The image recognizing method of claim 7, wherein in the accumulatively storing of a cause of disturbance, five results for every frame of the image are stored in the first and second buffers.

11. The image recognizing method of claim 7, wherein, when the number of normal result is greater than the number of times of detecting fog and image disturbance from the result which is stored in the buffer, it is determined that the image is saturated.

12. The image recognizing method of claim 7, further comprising informing a driver that the image is not recognized when the disturbance is generated in the image.

* * * * *